United States Patent [19]
Stillinger

[11] Patent Number: 6,070,835
[45] Date of Patent: Jun. 6, 2000

[54] BALL-COMPRESSION GROMMET

[75] Inventor: David C. Stillinger, Cardiff, Calif.

[73] Assignee: Qualcomm Incorporated, San Diego, Calif.

[21] Appl. No.: 09/045,156

[22] Filed: Mar. 19, 1998

[51] Int. Cl.⁷ .................................................. F16L 5/00
[52] U.S. Cl. .............................. 248/56; 248/49; 403/90; 403/110
[58] Field of Search .................... 248/70, 73, 56, 248/49, 228.31, 288.51, 514–516, 512; 174/86, 85, 87; 403/90, 110, 143, 122

[56] References Cited

U.S. PATENT DOCUMENTS

| | | | |
|---|---|---|---|
| 169,383 | 11/1875 | Starr | 403/90 |
| 1,672,605 | 6/1928 | Dobrick | 248/56 |
| 3,900,180 | 8/1975 | McPhee | 248/288 |
| 4,299,363 | 11/1981 | Datschefski | 248/56 |
| 4,432,520 | 2/1984 | Simon | 248/56 |
| 4,905,940 | 3/1990 | Luka | 248/56 |
| 5,109,321 | 4/1992 | Maglica | 403/122 |
| 5,803,642 | 9/1998 | Sassmannshausen | 403/90 |

Primary Examiner—Leslie A. Braun
Assistant Examiner—Gwendolyn Baxter
Attorney, Agent, or Firm—Philip R. Wadsworth; Thomas M. Thibault

[57] ABSTRACT

A ball-compression grommet is disclosed which is used for mounting an object, such as an electrical or fiber optic cable, through a panel access hole. The ball-compression grommet allows the object to rotate to a wide variety of desired angles with respect to the panel surface, while maintaining an environmental seal against moisture and other contaminants found in outdoor environments. The ball-compression grommet comprises a spherical object having a passage formed substantially through its center. A threaded sleeve and nut are then used to capture the spherical object therebetween, while allowing rotation in relation to the nut and threaded sleeve. Both the threaded sleeve and the nut have an inside portion which is shaped to fit the contour of the spherical object. The spherical object is free to rotate in relation to the threaded sleeve/nut assembly, while at the same time forming an environmental seal from a compression fitting that results between the spherical object and the threaded sleeve. The sleeve/nut assembly may be mounted to an access hole using a retaining nut, securing the ball-compression grommet to the mounting surface.

17 Claims, 6 Drawing Sheets

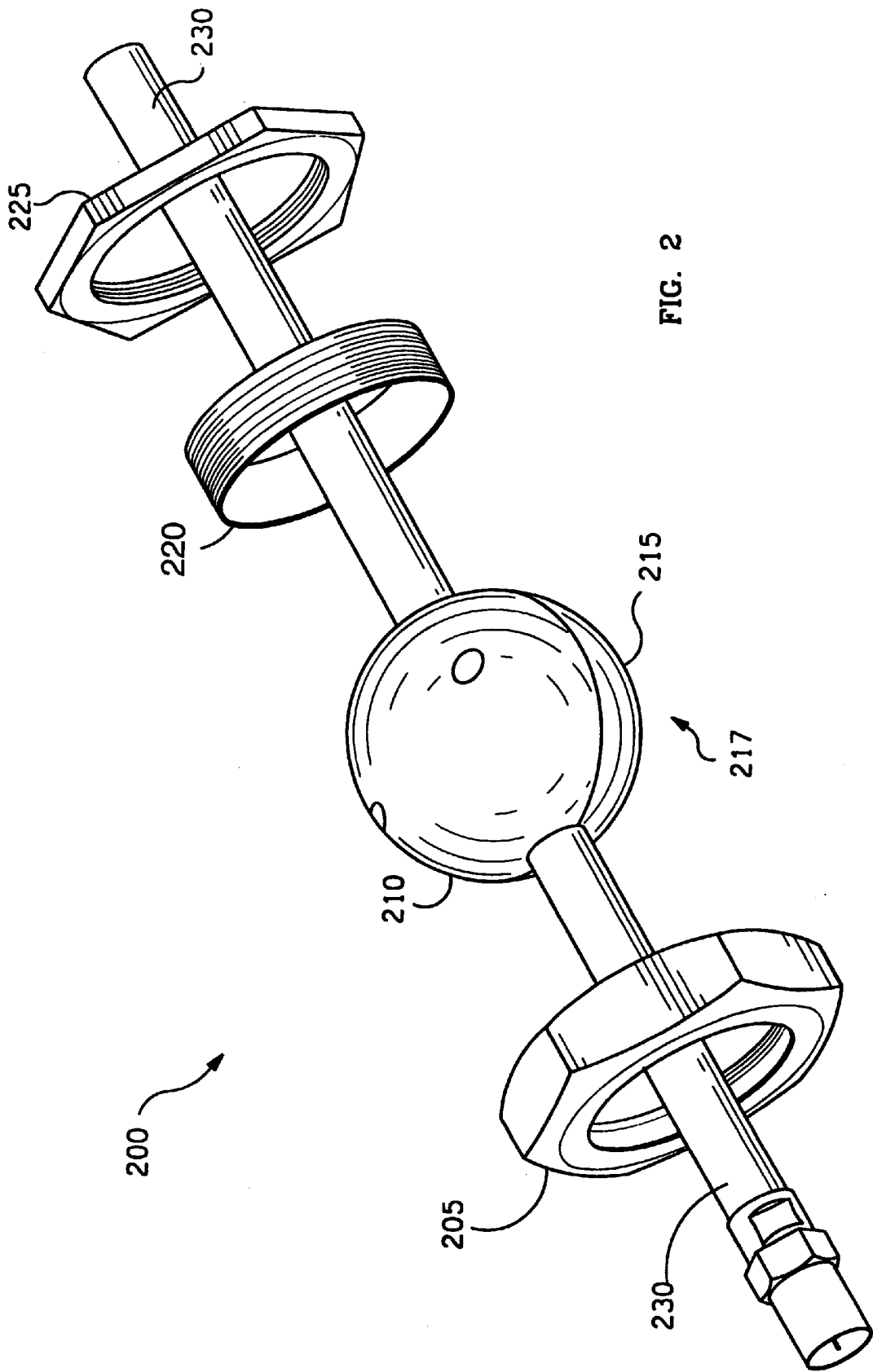

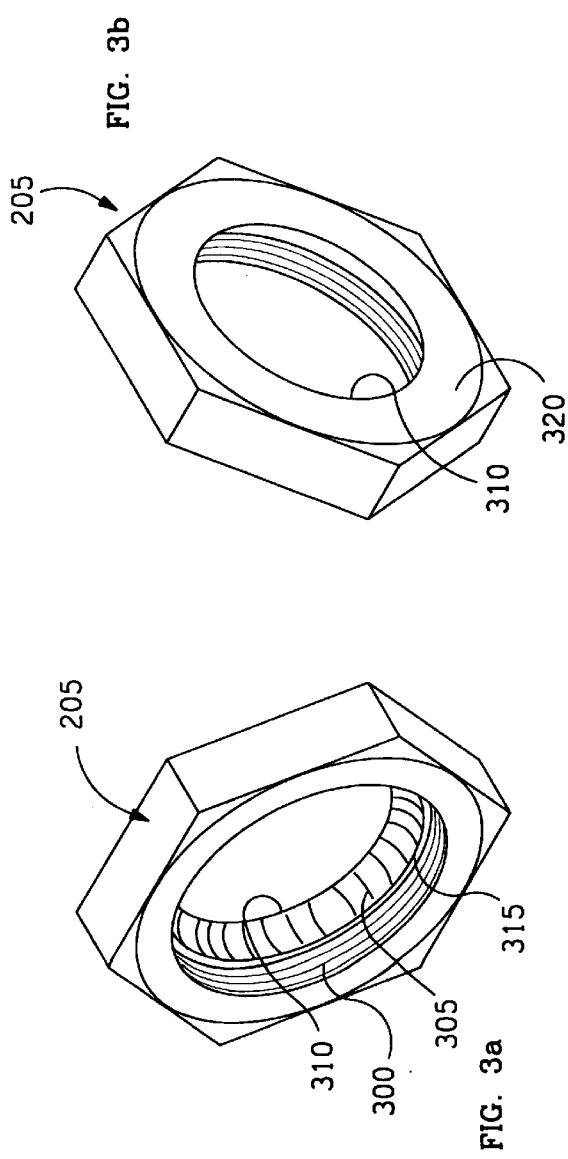
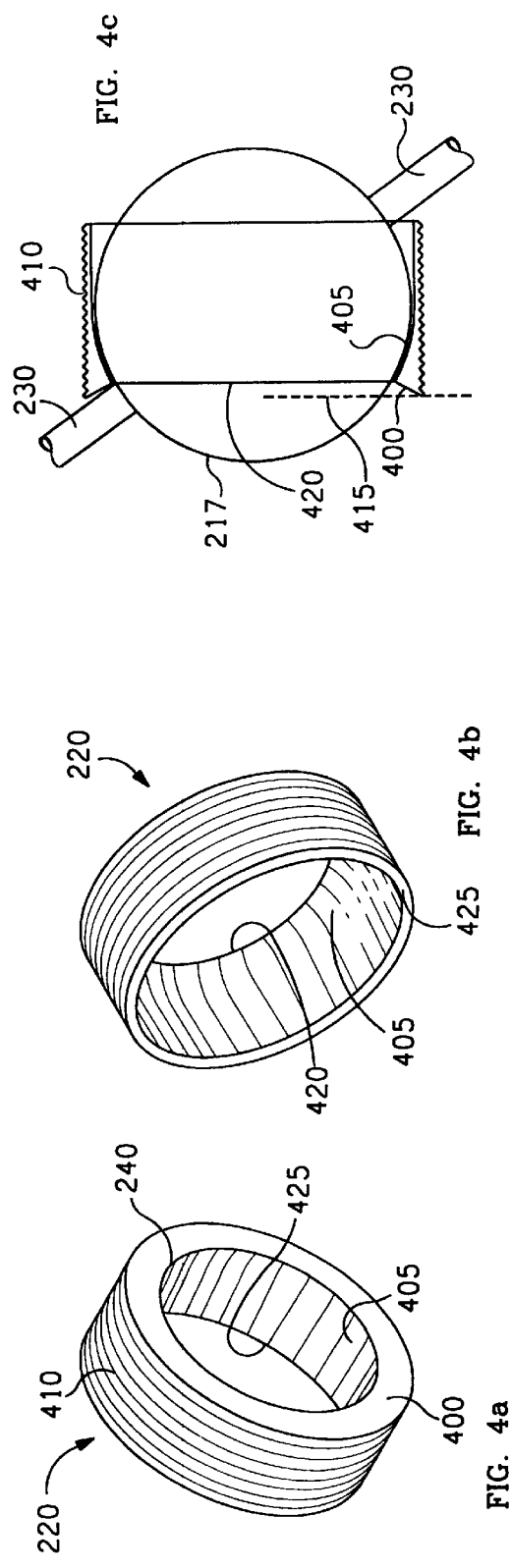

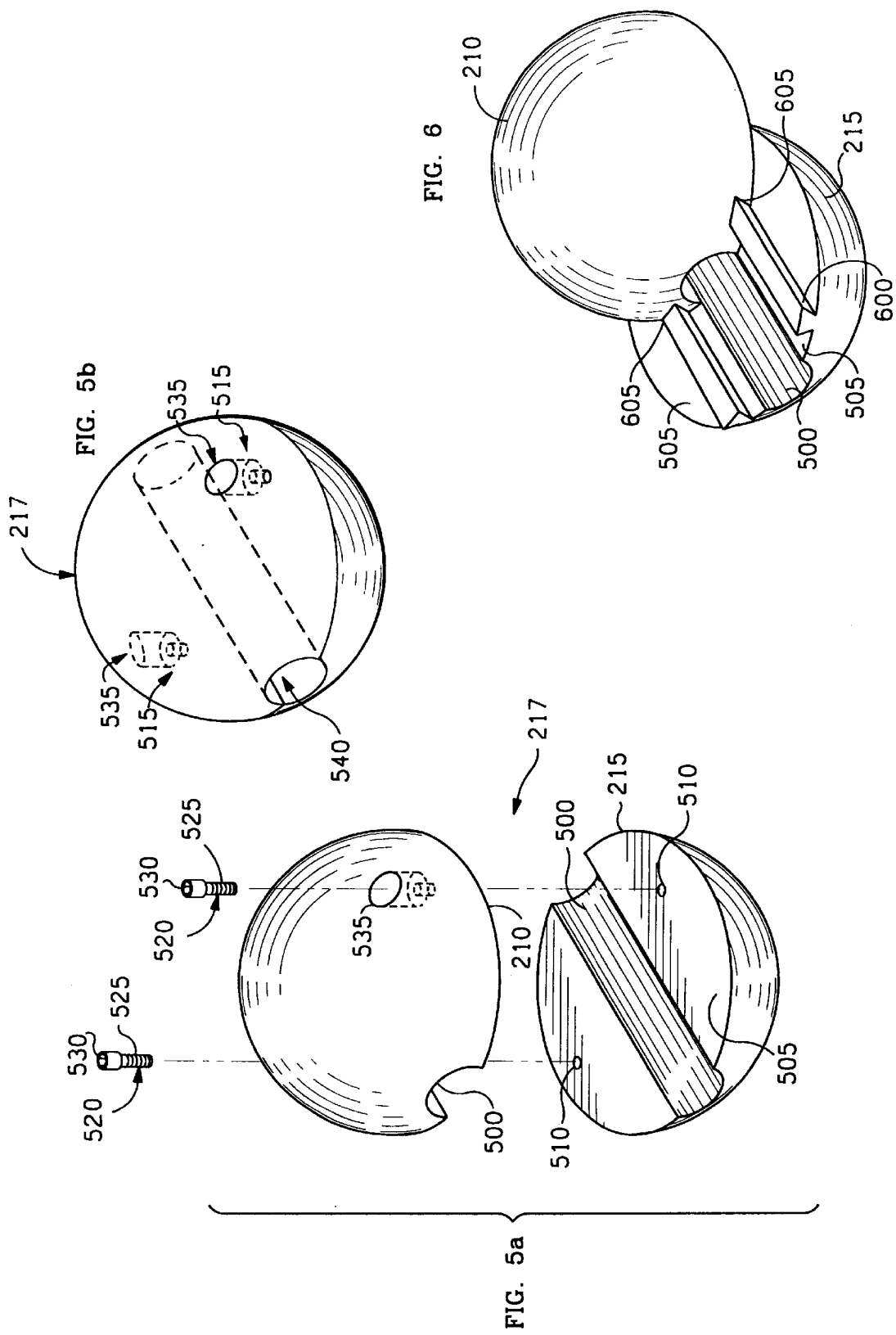

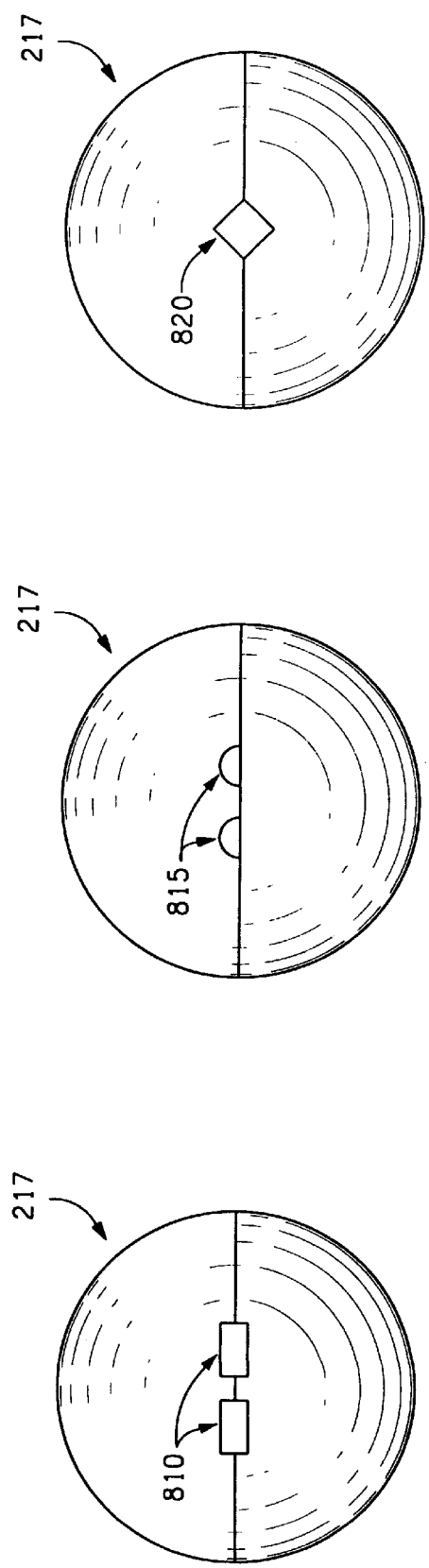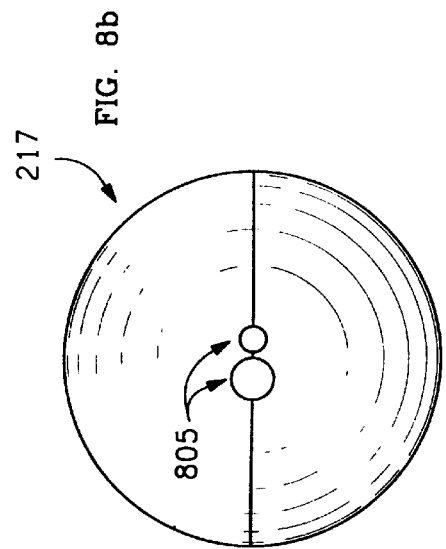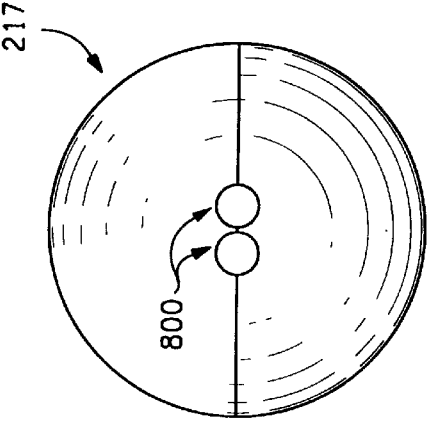

BALL-COMPRESSION GROMMET

BACKGROUND OF THE INVENTION

I. Field of the Invention

This invention relates to electrical and fiber optic cable mounting and protection. More particularly, the present invention relates to a method and apparatus for routing electrical and fiber optic cables through and sealing across enclosure bulkheads typically located in outdoor environments.

II. Description of the Related Art

Many electrical or electromechanical assemblies are housed inside enclosures to protect them against the environment or certain environmental conditions in which they are located. Frequently, these assemblies require electrical signals from external sources for their operation and/or need to provide signals to other devices located outside of the enclosure. Such signals are often transferred using electrical or fiber optic cables. The cables or conductors must be passed through a wall of the enclosure in order to interface with the electrical/electro-magnetic assembly inside or other devices outside.

Typically, one or more apertures are formed through a wall of the enclosure to allow cable access to the electrical assembly inside. Each aperture, or access hole, must be large enough in area to pass a corresponding cable and sometimes a cable-mounted connector.

Several problems result from forming the access holes. In the case of a metal enclosure, sharp edges may result from forming the access holes which can cut through the cable's insulation, shorting out the electrical signal carried by one or more center conductors. Another problem is that the access holes allow moisture, dirt, and other contaminants inside the enclosure which can damage the electrical components inside.

To combat these problems, rubber grommets have been used to protect the cables from the sharp metal edges of the access holes. A grommet can be mounted around an access hole to provide a non-abrasive surface against which a cable may rest. The grommets are inexpensive, easy to install, and work quite well at preventing cable damage due to chaffing. However, the inside diameter of the grommet must be large enough to allow sufficient clearance for the cable and connector. Typically, the connector diameter is much larger than the cable diameter so that once the cable is installed through the access hole and grommet, a gap remains between the cable outer surface and the grommet inner surface. This gap allows moisture and dirt to penetrate the enclosure which can result in damage to the assembly or components inside. Additionally, the gap permits the cable to move in applications where vibration is prevalent, which may damage the cable or degrade the electric or fiber optic signals therein.

To eliminate the gap between the inner grommet surface and the cable jacket, a second type of rubber grommet has been developed. This grommet is described in U.S. patent application Ser. No. 08/889,347, entitled "SLIDING GROMMET," which is incorporated by reference herein. This type of grommet comprises a bell-shaped housing as part of a typical O-shaped grommet, mounted to an access hole in a wall. The bell-shaped housing protrudes from the wall or surface to which it is mounted at a fixed angle, typically 45 or 90 degrees. A cable is fed through the bell-housing and access hole, and is then connected to a mating connector inside the enclosure. Finally, a plug is installed around the cable and brought toward the bell-shaped housing, where it is inserted and secured in place with a tie-wrap or other suitable device.

One problem that results from using the bell-shaped grommet described above is that the angle of the cable protruding from the enclosure is somewhat fixed, especially if an environmental seal is achieved by the grommet. Often it is desirable to alter the cable mounting angle with respect to the enclosure surface. Using a bell-shaped grommet as described above, an attempt to alter the cable position or routing can unseat the housing, allowing exposure of the enclosure interior to outside contaminants. The housing may also become dislodged due to vibration or sudden movements which are typical in mobile applications.

An additional problem which results when using conventional or bell-shaped grommets is the decreased bend radius that results from a sharp mounting angle, shown in FIG. 1a. In many applications, the cable is installed into a cramped environment, forcing a bend radius smaller than the cable is designed to withstand. This is especially a problem with fiber optic cables. The problem is lessened somewhat by the use of an angled bell-housing, as shown in FIG. 1b, however, the cable mounting angle is fixed and unable to be altered, if needed.

What is needed is a grommet which provides a weatherproof cable interface to an enclosure, while enabling maximum cable movement and a variable mounting angle relative to the enclosure surface.

SUMMARY OF THE INVENTION

The present invention is a ball-compression grommet used for mounting a cable through an access hole in a panel, enclosure, or other solid structure. The ball-compression grommet allows the cable to assume a wide range of mounting angles with respect to the mounting surface, while maintaining an environmental seal against moisture and other contaminants that can be found in outdoor environments. The ball-compression grommet can be used in any application where cable movement is expected or in applications where a severe bend radius would result using conventional grommets.

The ball-compression grommet comprises a spherical object having a cable passage formed through its center. The diameter of the cable passage is slightly smaller than the cable diameter so that a compression seal is established between the cable passage and the cable when the cable is secured in place. The spherical object comprises two hemispheres, each hemisphere having one half of the cable passage formed along a base of the hemisphere. The hemispheres are joined together using suitable fastening means after the cable is placed onto one of the half cable passages. The ball-compression grommet further comprises a threaded sleeve and a specially-designed nut which encloses the spherical object, forming a compression fitting between the threaded sleeve and the spherical object. Both the threaded sleeve and the specially-designed nut have inside surfaces which are shaped to fit the outer contour of the spherical object. The spherical object is free to rotate in relation to the threaded sleeve/nut combination, while being restricted from movement along the cable central axis.

The ball-compression grommet may then be mounted to an access hole, appropriately sized to accommodate the threaded sleeve exterior, while preventing the nut from passing through. A retaining nut is then secured to the threaded sleeve from an opposing mounting surface. The ball-compression grommet provides an environmental seal against moisture and contaminants, while permitting the cable to assume a variety of desired mounting angles with respect to the mounting surface.

Other embodiments of the invention include variations to the cable passage shape and placement. For example, the cable passage can be formed in only one of the two hemispheres and/or assume a variety of cross-sections, including square or diamond-shaped designs. In addition, multiple cables can be accommodated by the use of multiple cable passages formed in one or both hemispheres.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2 is an exploded view of a ball-compression grommet shown with a cable in accordance with the teachings of the present invention;

FIGS. 3a and 3b illustrate a specially-designed nut used in the ball-compression grommet of FIG. 2;

FIGS. 4a, 4b, and 4c illustrate a threaded sleeve used in the ball-compression grommet of FIG. 2;

FIG. 5 illustrates a spherical object used in the ball-compression grommet of FIG. 2;

FIG. 6 illustrates a second embodiment of the spherical object of FIG. 5;

FIGS. 8a, 8b, 8c, 8d, and 8e illustrate the spherical object of FIG. 5 shown in alternative embodiments.

DETAILED DESCRIPTION OF THE PREFERRED EMBODIMENTS

Figures 1A, 1B:
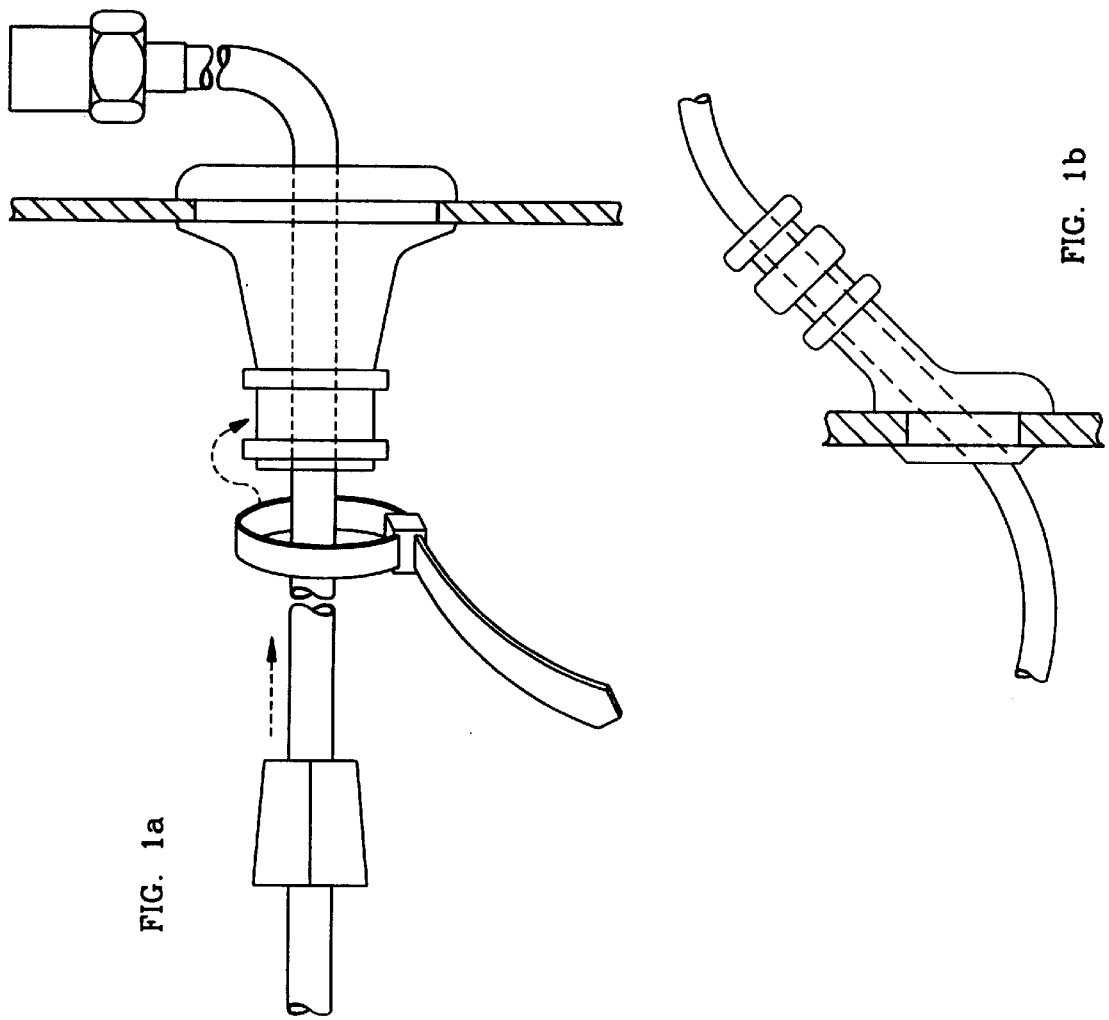
FIGS. 1a and 1b show two bell-shaped grommets.

The present invention is an apparatus which provides a gimbaled interface through an aperture in a mounting surface. The apparatus also provides an environmental seal against moisture and other contaminants from passing through the interface. The apparatus, known as a ball-compression grommet, allows an electrical or fiber optic cable to be positioned at a variety of angles with respect to the mounting surface through which it is installed. The ball-compression grommet is particularly useful in applications where cable movement is expected or where a small bend radius in the cable is desired.

It should be understood that objects other than cables may utilize the gimbaled interface provided by the ball-compression grommet. Although the present invention is typically used to provide an electrical or fiber optic cable interface through an aperture, it can also be used to pass objects such as tubes, pipes, antennas, or other solid objects which require a rotatable, environmentally sealed interface. For the remainder of this specification, where reference is made to a cable, it should be understood that other objects, such as those mentioned above, may be substituted in place of the cable.

FIG. 2 is an exploded view of a preferred embodiment of the present invention. A ball-compression grommet 200 is shown comprising first nut 205, upper hemisphere 210, lower hemisphere 215, and threaded sleeve 220. Shown also is cable 230 and retaining nut 225. Upper hemisphere 210 and lower hemisphere 215 are positioned around cable 230, then joined together using any one of a number of techniques know in the art, such as screws, bolts, rivets, or even adhesives. The combination of upper hemisphere 210 and lower hemisphere 215 forms spherical object 217, which is described in greater detail later herein. A cable passage is formed through a central portion of spherical object 217, allowing cable 230 to pass. First nut 205 and threaded sleeve 220 are then placed onto the cable from opposing cable ends and joined together, enclosing spherical object 217. First nut 205 and threaded sleeve 220 are joined by engaging a set of internal and external threads, respectively, and rotating one with respect to the other. First nut 205 and threaded sleeve 220 are tightened against spherical object 217, forming a compression fitting between spherical object 217, threaded sleeve 220, and first nut 205. The combination of first nut 205 and threaded sleeve 220 also form the structure needed for spherical object 217 to rotate in a ball-and-socket type of arrangement.

Ball-compression grommet 200 may then be installed into a panel access hole through which cable 230 is to pass. The access hole must be of sufficient diameter to pass threaded sleeve 220, while preventing first nut 205 from passing. Once the ball-compression grommet is installed into the panel access hole, retaining means, such as retaining nut 225, is positioned onto cable 230 and is secured onto threaded sleeve 220 by rotating it about the external threads of threaded sleeve 220. Retaining nut 225 is rotated about threaded sleeve 220 until it secures against the panel through which ball-compression grommet 200 is installed. It should be understood that other devices can be used to secure ball-compression grommet 200 into place, such as a C-clamp which snaps into a concentric groove formed around the exterior of threaded sleeve 220.

Cable 230 may now be oriented at any angle relative to the panel, within the limitations of the cable diameter and physical dimensions of first nut 205. Moisture and other contaminants are prevented from passing through the panel access hole by virtue of the compression fitting between cable 230 and cable passage spherical object 217 and by the compression seal formed between spherical object 217 and the inside of threaded sleeve 220. Further details of ball-compression grommet are provided below.

FIGS. 3a and 3b show first nut 205 in detailed view. FIG. 3a details first nut 205 showing the inside surfaces which interface with spherical object 217 and threaded sleeve 220. FIG. 3b details first nut 205 showing the surface which is viewable after ball-compression grommet 200 is assembled and installed.

As shown in FIG. 3a, first nut 205 comprises inside threads 300, concave surface 305, bore 310, and transition rim 315. First nut 205 is secured to threaded sleeve 220 by engaging inside threads 300 to matching outside threads located on threaded sleeve 220. Concave surface 305 is an annular depression which is rounded to accommodate spherical object 217 such that spherical object 217 is free to rotate to a variety of angles in relation to first nut 205 once ball-compression grommet 200 is assembled. Those skilled in the art may readily determine the correct shape of concave surface 305 in order to allow spherical object 217 to rotate in a ball-and-socket type of arrangement.

FIG. 3b shows first nut 205 from an opposing view from that shown in FIG. 3a. First nut 205 is shaped similar to conventional nuts, shown in FIG. 3b as having six sides, although more or fewer sides could be used without affecting the functionality of the present invention. First nut 205 has a planar surface 320, having bore 310 formed therethrough.

During use, spherical object 217 protrudes through bore 310, allowing an installed cable to achieve a variety of desired mounting angles with respect to the panel surface through which it is mounted. The smaller bore 310 is in diameter, the less spherical object 217 protrudes from bore 310, which in turn provides less rotational angle for positioning the cable. Conversely, the larger bore 310 is in diameter, the more spherical object 217 protrudes from bore 310, allowing increased cable clearance for maximum rotational movement of spherical object 217 and the installed cable. The maximum diameter of bore 310 is limited to slightly less than the diameter of spherical object 217. This limitation is necessary to prevent spherical object 217 from passing completely through bore 310.

FIGS. 4a, 4b, and 4c show a more detailed view of threaded sleeve 220. FIG. 4a details threaded sleeve 220 in perspective along the central axis. FIG. 4b shows threaded sleeve 220, again in perspective, from an opposing view as that of FIG. 4a. FIG. 4c shows threaded sleeve 220 in cross section along with cable 230 and spherical object 217. Threaded sleeve 220 acts as a compression fitting against spherical object 217, providing a seal against moisture and other contamination. Threaded sleeve 220 is made of any hard material which will compress spherical object 217, forming an environmental seal thereto, while still permitting spherical object 217 to rotate within the confines of threaded sleeve 220 and first nut 205. Materials such as plastic and metal are typically used to construct threaded sleeve 220, although a variety of hard materials known for such an application will suffice.

Threaded sleeve 220 is substantially cylindrical in shape, as depicted in FIG. 4a. Threads 410 are located on the surface which are used to engage first nut 205 and retaining nut 225 during use. Concave surface 405 is an annular depression which is shaped to accommodate spherical object 217, and is located between first rim 420 and second rim 425. Those skilled in the art can readily determine the correct shape of concave surface 405 so that spherical object 217 fits smoothly within concave surface 405, allowing spherical object 217 to rotate freely.

FIGS. 4a and 4c show angled surface 400. Angled surface 400 allows cable 230 to assume a greater rotational angle than if a squared surface was used in the design. As shown in FIG. 4c, cable 230 may be rotated with respect to threaded sleeve 220 until it rests against angled surface 400. Angled surface 400 forms an angle with respect to an imaginary horizontal reference line 415, varying from as little as zero degrees to as much as forty five degrees or more. In the preferred embodiment, angled surface 400 forms a 45 degree angle with imaginary horizontal reference line 415. Those skilled in the art may determine what angle is needed for each specific application.

FIG. 4b shows threaded sleeve 220, detailing concave surface 405. A cross section of concave surface 405 is shown in FIG. 4c. Concave surface 405 ends in a rim 420 on one end, as shown in FIG. 4c, and is shaped to accommodate spherical object 217 so that spherical object 217 rests smoothly against concave surface 405, allowing spherical object 217 to rotate therein.

As shown in FIG. 4c, spherical object 217 protrudes through an orifice defined by first rim 420, exposing enough of spherical object 217 to allow a cable installed through spherical object 217 to achieve various degrees of rotation. The smaller that first rim 420 is in diameter in relation to the diameter of spherical object 217, the less spherical object 217 protrudes from first rim 420, which in turn provides less rotational angle for the cable to be positioned without striking first rim 420. Conversely, the larger that first rim 420 is in diameter with respect to the diameter of spherical object 217, the more spherical object 217 protrudes from first rim 420, allowing maximum rotational movement of spherical object 217 and the installed cable. The maximum diameter of first rim 420 is limited to slightly less than the diameter of spherical object 217. This prevents spherical object 217 from passing completely through the orifice.

FIG. 5 shows spherical object 217 comprising upper hemisphere 210 and lower hemisphere 215. Spherical object 217 can be manufactured from a variety of compressible materials, such as plastic, rubber, polyurethane, or other materials known in the art, to achieve an environmental seal. By allowing compression, spherical object 217 creates a ball-compression fitting when assembled between first nut 205 and threaded sleeve 220, providing a seal against environmental conditions. In applications where an environmental seal is not required, spherical object 217 can be manufactured from an incompressible material, such as metal.

In the preferred embodiment, each hemisphere has a groove 500 formed within planar surface 505 which approximates substantially half of a cable diameter to be installed thereon. Groove 500 may be slightly smaller than half of a cable diameter so that a compression fit may be obtained between groove 500 and an installed cable. In other applications where an environmental seal is not required, groove 500 may be equal to or slightly greater than the cable diameter. In any case, a cable to be used with ball-compression grommet 200 is placed onto either lower hemisphere 215 or upper hemisphere 210 in groove 500, then the opposing hemisphere is placed on top of the hemisphere/cable combination, forming spherical object 217. Both grooves 500 form cable passage 540, shown in FIG. 5b, through substantially the center of spherical object 217, through which a cable is located. Moisture and other contaminants are prevented from passing through spherical object 217 due to the compression fitting of cable passage 540 against the cable.

In the preferred embodiment, cable passage 540 is circular in cross section, although the cross sectional shape of cable passage 540 could take many different forms, depending on the physical properties of the cable, tubing, or other object to be installed. For example, cable passage 540 could have a square, diamond, oval, or hexagon-shaped cross section, among others. In addition, cable passage 540 could be comprised of one or more passages, the passages being centered or off-centered from a central axis. Finally, cable passage 540 could be entirely contained within one of the hemispheres, having the other hemisphere planar surface be substantially flat.

Upper hemisphere 210 and lower hemisphere 215 are joined together using one of any number of methods known in the art. In the preferred embodiment, lower hemisphere 215 and upper hemisphere 210 are joined together using fastening device 520 through mounting holes 510 and through holes 515. Fastening device 520 is an Allen-head screw in the preferred embodiment, although other fasteners known in the art may be used instead, such as nails, bolts, rivets, or screws having a flat, Philips, star, or other head. Mounting holes 510 have internal threads for engaging fastening device 520, while through holes 515 have no such threads. The mounting holes are typically located on either side of groove 500, substantially half way along its length, and spaced equidistant from the groove central axis. Fewer or more fastening devices may be used in different locations as long as the two hemispheres are prevented from moving with respect to one another.

Through holes 515 each typically comprise two different-sized diameter holes, a first hole extending from the rounded surface of upper hemisphere 210 to a second hole extending through the remaining material of hemisphere 210 to planar surface 505. The first hole has a diameter large enough to pass a shank 525 and head 530 of fastening device 520, typically a screw, although other fastening devices known in the art may be used instead. Rim 535 defines the first hole aperture on the surface of upper hemisphere 210 and is formed within the spherical shape of the hemisphere so that it retains its smooth, spherical appearance. The second hole has a diameter large enough to pass shank 525 of fastening device 520, but small enough to prevent head 530 from passing. During assembly, upper hemisphere 210 is placed upon lower hemisphere 215, sandwiching cable 230 between grooves 500 on each hemisphere. Fastening devices 520 are then placed through each through hole 515, then tightened into each mounting hole 510, securing lower hemisphere 215 to upper hemisphere 210, and forming spherical object 217.

It should be understood that the two hemispheres may be joined by any number of techniques known in the art. For example, the hemispheres may be held together by a substance deposited on planar surface 505, such as liquid adhesives. Another possibility is the use of a locking device built into each hemisphere similar to the one shown in FIG. 6. Rails 600 are shown in FIG. 6 mounted to planar surface 505 which engages corresponding rail receptacles 605. Upper hemisphere 210 contacts lower hemisphere 215 along planar surface 505, sliding in the direction of groove 500. Rails 600 are received by rail receptacles 605, locking the two hemispheres in place. It should be understood that the cross section of rails 600 and rail receptacles 605 may differ from that shown in FIG. 6 while still providing a locking fit between the two hemispheres. Generally, the cross section of rails 600 are more narrow at the rail base, i.e., along planar surface 505, than at the rail top. The exact shape of rails 600 and 605 are readily determined by those skilled in the art.

Finally, upper hemisphere 210 and lower hemisphere 215 need not be joined together by any mechanism, if so desired. In this embodiment, the two hemispheres are held together manually around cable 230, typically by hand, and installed into first nut 205 and threaded insert 220. First nut 205 and threaded insert 220 form an enclosure around spherical object 217, preventing the two hemispheres from separating. In another embodiment, the two hemispheres may be prevented from movement with respect to each other by using a combination of well known interference mechanisms such as pins, dimples, bumps, grooves, or rails.

Figure 7:
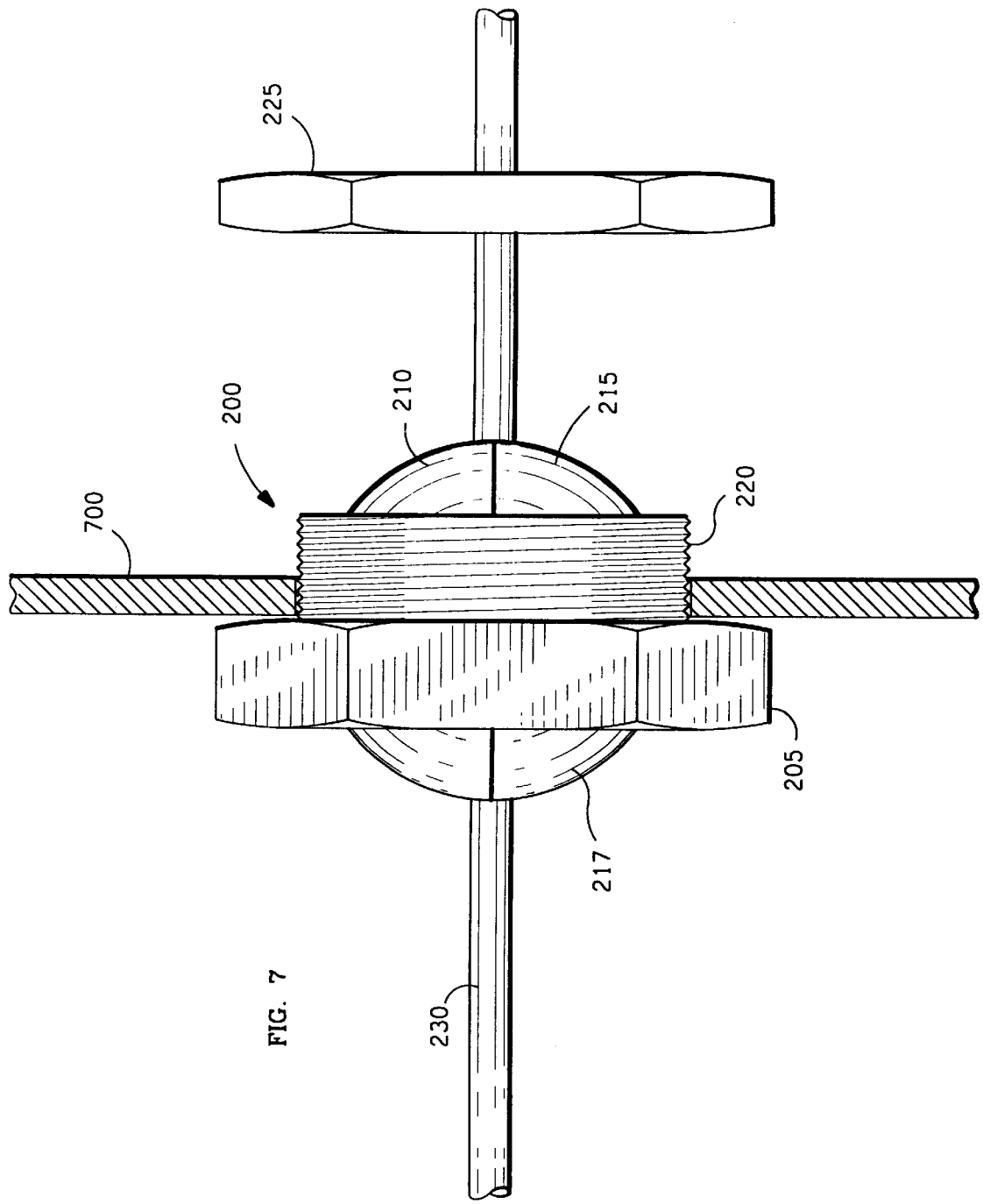
FIG. 7 illustrates the ball-compression grommet and cable of FIG. 2, shown installed in a mounting panel.

FIG. 7 is a side view of ball-compression grommet 200 mounted in panel 700. An access hole is formed in panel 700 approximately equal to the diameter of threaded sleeve 220. As described previously, cable 230 is placed into groove 500 of spherical object 217, sandwiched between lower hemisphere 215 and upper hemisphere 210. The combination of cable 230, spherical object 217, first nut 205, and threaded sleeve 220 is then inserted through the access hole in panel 700. The assembly is secured in place using fastening device 225, which, in the preferred embodiment, is a nut. After ball-compression grommet 200 has been installed onto panel 700, cable 230 may be pivoted to a variety of desired angles with respect to panel 700, limited by only the cable outer surface against the edge of threaded sleeve 220. Moisture and other contaminants are prevented from passing through the ball-compression grommet assembly due to the compression fitting of spherical object 217 against concave surface 405 of threaded sleeve 220 and concave surface 305 of first nut 205, and between cable 230 and groove 500 of spherical object 217.

FIG. 8 illustrates alternative embodiments of spherical object 217. Specifically, cable passage 540 is shown in various shapes and sizes. FIG. 8a illustrates cable passage 800 comprising two, side-by-side cable passages through substantially the center of spherical object 217. The cable passages are created from two grooves, each groove substantially similar in shape and size, formed on a planar surface of one of the two hemispheres comprising spherical object 217. FIG. 8b shows cable passage 805 comprising two, side-by-side cable passages, one passage having a different diameter than the other. Again, both cable passages are created from two grooves, each groove substantially similar in shape and size, formed on the planar surface of both hemispheres comprising spherical object 217, although each groove on a particular hemisphere is shaped in accordance with the cable diameter to be placed thereon. FIG. 8c shows cable passage 810 comprising two rectangular cable passages formed in the same way as the previous channels. FIG. 8d shows cable passage 815 as a pair of semi-circles formed on only one of the two hemispheres comprising spherical object 217. FIG. 8e shows cable passage 820 as a diamond-shaped passage. It should be understood that other variations of cable passage 540 are possible, the cross section of which substantially conforming to the cross section of a cable, tubing, or other object to be installed through spherical object 217.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A ball-compression grommet for providing a gimbaled interface for an object installed therethrough, comprising:
    a spherical object having at least one passage formed therethrough, said spherical object comprising two hemispheres, each of said hemispheres having a substantially rounded surface and a flat planar surface;
    a groove formed on each of said planar surfaces, said groove substantially bifurcating each of said hemispheres, said groove having a semicircular cross section, said groove forming said passage when said ball-compression grommet is assembled;
    a threaded sleeve having a first concave surface for receiving said spherical object and a rim for allowing a portion of said spherical object to protrude; and
    a first nut having a threaded surface for engaging said sleeve and a second concave surface, wherein a compression fitting is formed by a containment of said spherical object against said first concave surface and said second concave surface, while allowing said spherical object to rotate therebetween.

2. The ball-compression grommet of claim 1 further comprising retaining means for securing said spherical object, said first nut, and said threaded sleeve to a mounting surface.

3. The ball-compression grommet of claim 2 wherein said retaining means is a retaining nut threadingly engaged to said threaded sleeve.

4. The ball-compression grommet of claim 1 wherein said at least one passage is formed substantially through a central portion of said spherical object.

5. The ball-compression grommet of claim 1 wherein a diameter of said at least one passage is substantially equal to a respective outer surface of an object to be installed therethrough.

6. The ball-compression grommet of claim 1 wherein said at least one passage has a substantially circular cross section.

7. The ball-compression grommet of claim 1 wherein said at least one passage has a substantially rectangular cross section.

8. The ball-compression grommet of claim 1 wherein said at least one passage has a substantially oval-shaped cross section.

9. The ball-compression grommet of claim 1 wherein said at least one passage has a substantially hexagon-shaped cross section.

10. The ball-compression grommet of claim 1 wherein said threaded sleeve comprises;
   external threads for engaging at least said first nut;
   a second rim having a diameter smaller than the diameter of said spherical object;
   a third rim; and
   a concave surface, located between said second rim and said third rim, substantially conforming to a cross section of said spherical object.

11. The ball-compression grommet of claim 1 wherein said first nut comprises a concave surface substantially conforming to a cross section of said spherical object, and inside threads for engaging said threaded sleeve.

12. A method for providing a rotatable environmental seal for an object, comprising the steps of:
   installing at least one object through a spherical object, said spherical object having at least one passage formed therethrough, wherein a diameter of said at least one passage is smaller than a respective outer surface of said at least one object to be installed therethrough; and
   securing said spherical object between a first nut and a threaded sleeve, wherein a compression fitting is obtained between said threaded sleeve and said spherical object.

13. The method of claim 12 further comprising the step of mounting said spherical object, said first nut, and said threaded sleeve to an access hole located on a mounting surface.

14. The method of claim 12 wherein said spherical object, said first nut, and said threaded sleeve are secured to said mounting surface by a retaining nut threadingly engaged to said threaded sleeve.

15. The method of claim 12 wherein the step of installing at least one object through said spherical object comprises the steps of:
   forming two hemispheres from said spherical object, each hemisphere having a substantially rounded surface and a flat planar surface;
   forming said at least one passage on at least one of said flat planar surfaces;
   placing said object into a first passage on a first of said two hemispheres; and
   placing a second of said two hemispheres on top of said first hemisphere such that said planar surfaces are in contact with each other.

16. The method of claim 15 further comprising the step of securing said first hemisphere to said second hemisphere.

17. A ball-compression grommet for providing a gimbaled interface for an object installed therethrough, comprising:
   a spherical object having at least one passage formed therethrough, said spherical object comprising two hemispheres, each of said hemispheres having a substantially rounded surface and a flat planar surface, wherein a first of said hemispheres has said at least one passage formed on said planar surface and a second of said hemispheres has no passage formed on said planar surface;
   a threaded sleeve having a first concave surface for receiving said spherical object and a rim for allowing a portion of said spherical object to protrude; and
   a first nut having a threaded surface for engaging said sleeve and a second concave surface, wherein a compression fitting is formed by the containment of said spherical object against said first concave surface and said second concave surface, while allowing said spherical object to rotate therebetween.

* * * * *